(12) United States Patent  
Kim et al.

(10) Patent No.: US 9,215,299 B2  
(45) Date of Patent: Dec. 15, 2015

(54) COVER MEMBER ENGAGING DEVICE AND PORTABLE TERMINAL WITH BATTERY COVER ENGAGING STRUCTURE USING THE SAME

(75) Inventors: Doo-Hyun Kim, Gyeongsangbuk-do (KR); Byung-Joon Lee, Daegu (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 57 days.

(21) Appl. No.: 13/405,546

(22) Filed: Feb. 27, 2012

(65) Prior Publication Data

US 2012/0308865 A1    Dec. 6, 2012

(30) Foreign Application Priority Data

Jun. 3, 2011    (KR) .................. 10-2011-0053679

(51) Int. Cl.  
*H01M 2/10*    (2006.01)  
*H04M 1/02*    (2006.01)

(52) U.S. Cl.  
CPC .......... *H04M 1/0262* (2013.01); *H01M 2/1016* (2013.01); *H01M 2/1022* (2013.01); *H01M 2/1066* (2013.01)

(58) Field of Classification Search  
CPC ... H01M 2/0207; H01M 2/0217; H01M 2/04; H01M 2/0404; H01M 2/0473; H01M 2/10; H01M 2/1016; H01M 2/1022; H01M 2/1066; H04M 1/0262  
See application file for complete search history.

(56) References Cited

U.S. PATENT DOCUMENTS

2006/0234119 A1* 10/2006 Kruger et al. ................. 429/160  
2010/0124698 A1*  5/2010 Wu et al. ....................... 429/100

FOREIGN PATENT DOCUMENTS

JP    2005-204005 A    7/2005

* cited by examiner

*Primary Examiner* — Ula C Ruddock  
*Assistant Examiner* — Lisa S Park  
(74) *Attorney, Agent, or Firm* — Cha & Reiter, LLC

(57) ABSTRACT

A cover member engagement device and a portable terminal having a battery cover engagement structure using the same are provided, in which a battery mounting portion is formed on a rear surface of a housing of the portable terminal, engagement recesses are formed in both edges of the battery mounting portion, and engagement ribs are formed on a surface of a battery cover, for being engaged in the engagement recesses, wherein at least one first hook protruding from an inner side surface of at least one of the engagement ribs and at least one second hook protruding from an outer side surface of at least one of the engagement ribs are engaged with the housing.

15 Claims, 4 Drawing Sheets

COVER MEMBER ENGAGING DEVICE AND PORTABLE TERMINAL WITH BATTERY COVER ENGAGING STRUCTURE USING THE SAME

CLAIM OF PRIORITY

This application claims priority under 35 U.S.C. §119(a) to a Korean Patent Application filed in the Korean Intellectual Property Office on Jun. 3, 2011 and assigned Serial No. 10-2011-0053679, the contents of which are incorporated herein by reference.

BACKGROUND OF THE INVENTION

1. Field of the Invention

The present invention relates to a portable terminal, and more particularly, to a portable terminal having a battery pack protected by a battery cover.

2. Description of the Related Art

In general, a portable terminal enables a variety of mobile functions to a user which include an electronic note function such as scheduling, an entertainment function to enjoy multimedia such as music, video, or games, and a communication function such as Internet browsing or voice call. The portable terminal is typically provided with a built-in or a detachable battery pack to supply power for operation.

To replace a battery pack with a new one, the portable terminal must be disassembled which may pose a risk of damage during handling. As such, a user may opt to visit a service center to get the built-in battery pack replaced.

A detachable battery pack may be configured in two ways. One of them is to accommodate a battery cell in a battery casing fabricated with the same material as a housing that constitutes the exterior of a portable terminal (a case configuration). The other is to install a battery pack to a portable terminal and then engage a battery cover on the battery pack to protect the battery pack (a cover configuration). Although a portable terminal having the case configuration is relatively strong, it is not favorable for miniaturization. That is, since the battery pack surrounds the whole battery pack, there is a limit in reducing the thickness and size of the portable terminal. On the other hand, a battery pack having the cover configuration is installed to a portable terminal without using an additional casing. Thus, it is not necessary to increase the sizes of the battery pack and the portable terminal. Also, the battery cover can be fabricated in the form of a plate, which makes cover-type battery packs popular for small-size portable terminals.

Preferably, a battery cover is made thin for realizing a slim terminal. Today, a battery cover as thin as up to 0.7 mm is adopted in a portable terminal and made with a metal material. As the battery cover gets thinner, a force applied to the battery cover during assembling or disassembling the battery cover to or from the portable terminal may cause a permanent deformation to the battery cover. As a result, a distorting force or an external impact may deform a specific part of the portable terminal or a specific structure experiencing a concentrated stress due to the external force.

SUMMARY OF THE INVENTION

An aspect of embodiments of the present invention is to address at least the problems and/or disadvantages and to provide at least the advantages described below. Accordingly, an aspect of embodiments of the present invention is to provide a portable terminal having a battery cover that can outstand any deformation during attachment or removal to or from the portable terminal or against external impact.

Another aspect of embodiments of the present invention is to provide a portable terminal having a battery cover that is readily engaged with or removed from the portable terminal and can maintain a stable form once it is engaged with the portable terminal.

In accordance with an embodiment of the present invention, there is provided a portable terminal having a battery cover, in which a battery mounting portion is formed on a rear surface of a housing of the portable terminal, engagement recesses are formed in both edges of the battery mounting portion, and engagement ribs are formed on a surface of the battery cover, for being engaged in the engagement recesses when the battery cover is combined in the battery mounting portion. The engagement ribs are extended along both sides of the battery cover, facing each other and at least one first hook protruding from an inner side surface of at least one of the engagement ribs and at least one second hook protruding from an outer side surface of at least one of the engagement ribs are engaged with the housing.

In accordance with another embodiment of the present invention, there is provided a cover member engaging device in which a housing has at least one opening, a cover member is engaged with the housing for covering the opening, and engagement ribs are formed on the cover member for being engaged with the housing when the battery cover covers the opening. The engagement ribs are extended along both sides of the battery cover, facing each other and at least one first hook protruding from an inner side surface of at least one of the engagement ribs and at least one second hook protruding from an outer side surface of at least one of the engagement ribs are engaged with the housing, thereby engaging the cover member with the housing.

In accordance with yet another embodiment of the present invention, a portable terminal casing includes: a housing having recesses formed at both edges thereon, the recesses further including an inclination surface or a stepped portion; and a battery cover having at least one first hook and at least one second hook for engaging with the inclination surfaces or the stepped portion, wherein as the battery cover is removed from the housing, the at least one first hook and at least one second hook is removed from the inclination surface or the stepped portion without causing a substantial deformation to the battery cover.

BRIEF DESCRIPTION OF THE DRAWINGS

The above features and advantages of certain embodiments of the present invention will be more apparent from the following detailed description taken in conjunction with the accompanying drawings, in which.

DETAILED DESCRIPTION OF THE INVENTION

Reference will now be made in detail to the preferred embodiments of the present invention with reference to the accompanying drawings. For the purposes of clarity and simplicity, a detailed description of a generally known function and structure of the present invention will be avoided as not to obscure the subject matter of the present invention.

Figure 1:
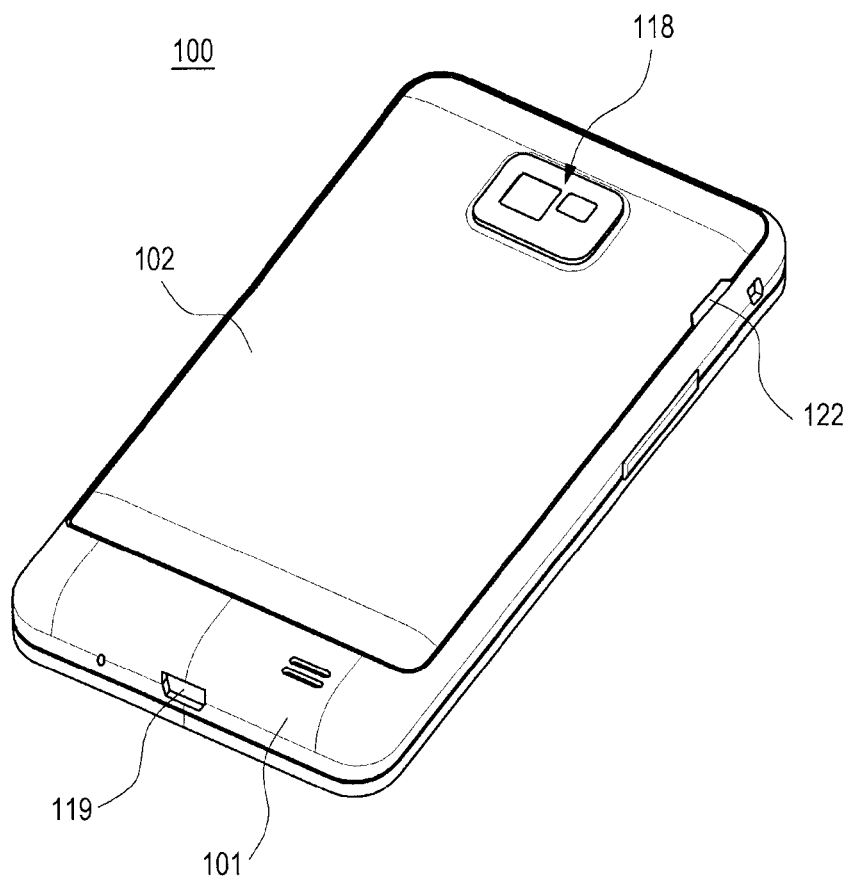
FIG. 1 is a perspective view of a portable terminal having a battery cover according to an embodiment of the present invention.
Figure 2:
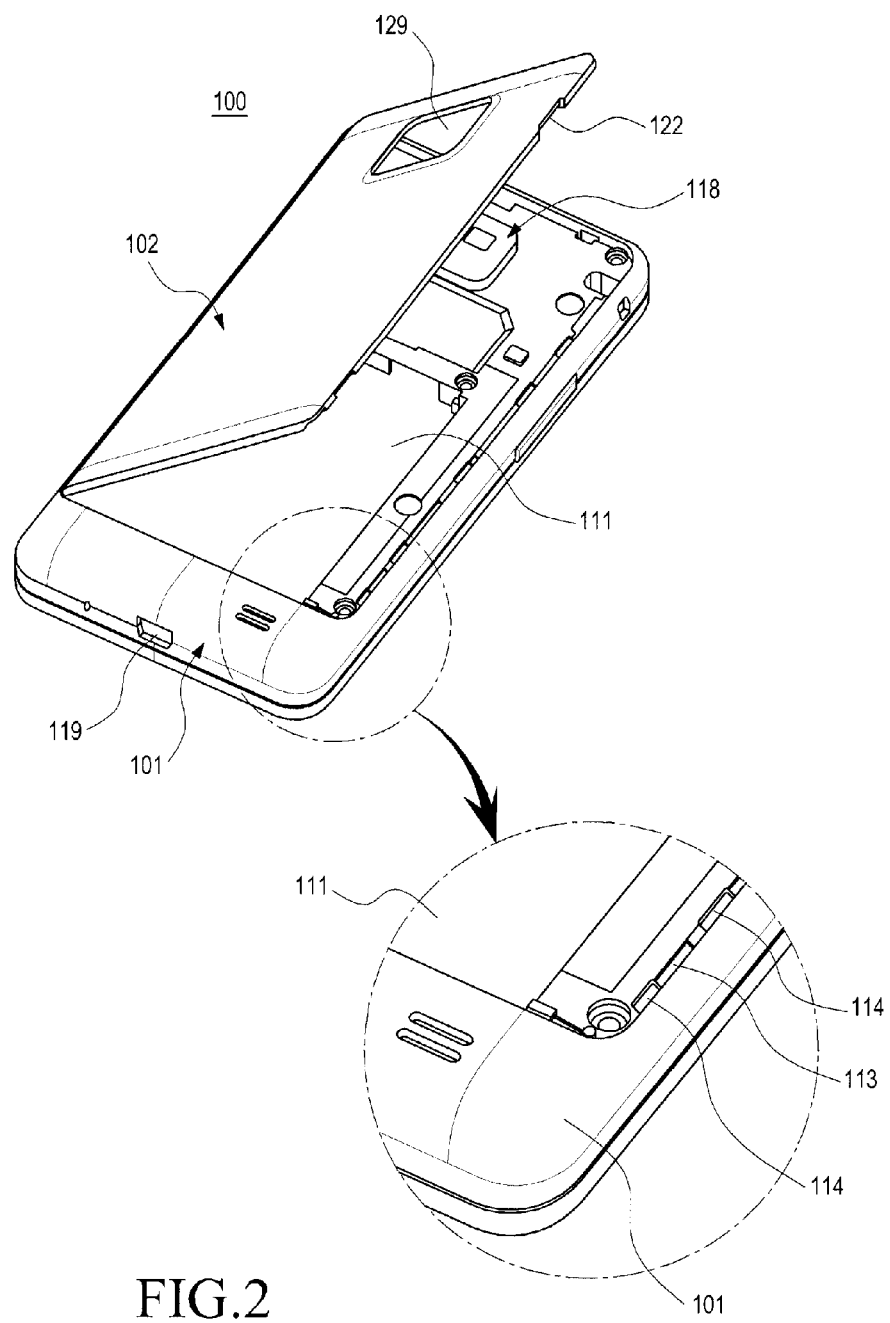
FIG. 2 is a perspective view of the portable terminal illustrated in FIG. 1 from which the battery cover is being removed.
Figure 3:
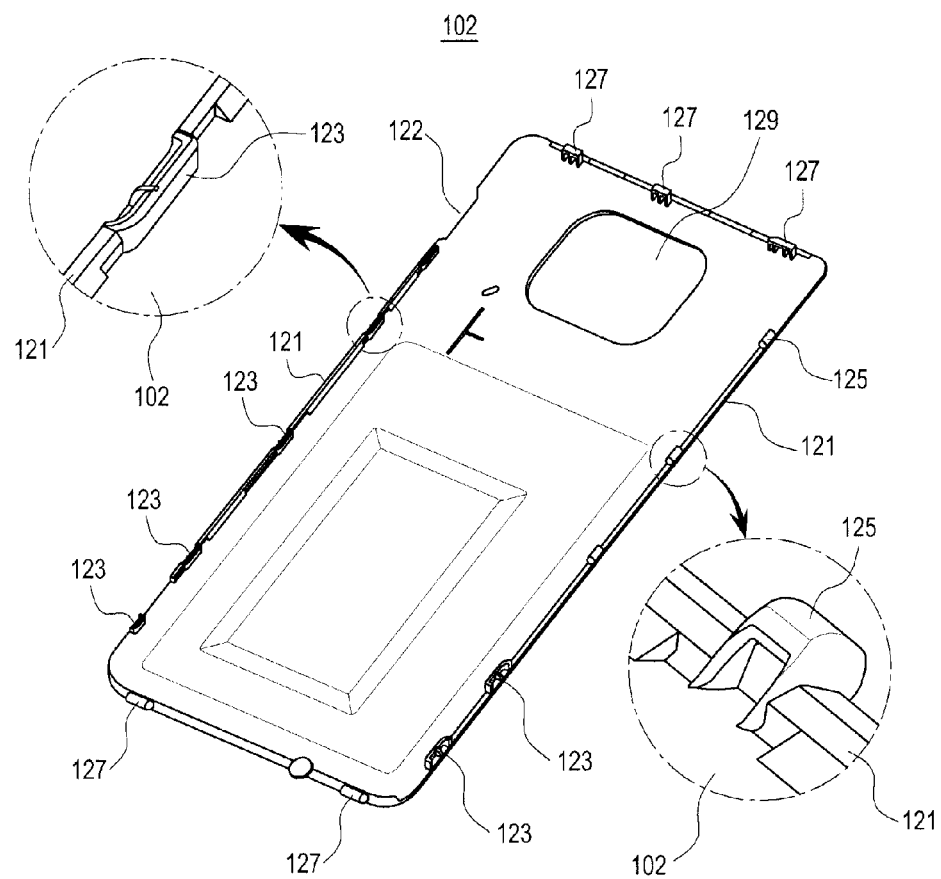
FIG. 3 is a perspective view of the battery cover in the portable terminal illustrated in FIG. 1.

Referring to FIGS. 1 and 2, a portable terminal 100 according to an embodiment of the present invention includes a battery cover 102 detachably coupled to a rear surface of a body housing 101. A recessed mounting portion 111 is formed on the rear surface of the body housing 101, so that a battery pack (not shown) may be mounted in the mounting portion 111. The battery cover 102 is engaged with the body housing 101, thereby covering and protecting the mounting portion 111 and the battery pack mounted within the mounting portion 111. Engagement ribs (121 in FIG. 3) are formed along both sides of the battery cover 102, and hooks 123 and 125 are formed on the engagement ribs 121. The hooks 123 and 125 are spaced from one another. The hooks 123 are formed on inner surfaces of the engagement ribs 121, and the hooks 125 are formed protruding on outer surfaces of the engagement ribs 121.

An interface terminal 119 may be provided at a lower end of the body housing 101 for charging the portable terminal 100 or connecting the portable terminal 100 to an external device such as a computer. A camera module 118 may be installed in the mounting portion 111 on the rear surface of the body housing 101. While not shown, a display and a key for activating the display are arranged on a frontal surface of the body housing 101. It should be note that while the portable terminal 100 is shown as a bar type having only the body housing 101 in the embodiment of the present invention, it will be clearly understood to those skilled in the art that if the body housing 101 is adapted to be engaged rotatably or slidably with another housing, the battery cover 102 having the configuration according to the present invention is also applicable to a folder-type or sliding-type portable terminal. If the body housing 101 is adopted in a folder-type or sliding-type portable terminal, only one of a keypad and a display may be installed on the frontal surface of the body housing 101. Accordingly, the teachings of the present invention may be applicable to various types of terminal types.

An engagement recess 113 is formed along each of both edges of the mounting portion 111. The engagement recesses 113 are extended along a length direction of the body housing 101. Later-described stepped portions 117 and inclination surfaces 115 are formed in the engagement recesses 113. The hook grooves 114 are formed in the engagement recesses 113, respectively and are positioned in correspondence with the hooks 123 and 125. The stepped portions 117 and inclination surfaces 115 are positioned respectively in correspondence with the hooks 123 and 125, to thereby engage the battery cover 102 with the body housing 101.

Figure 4:
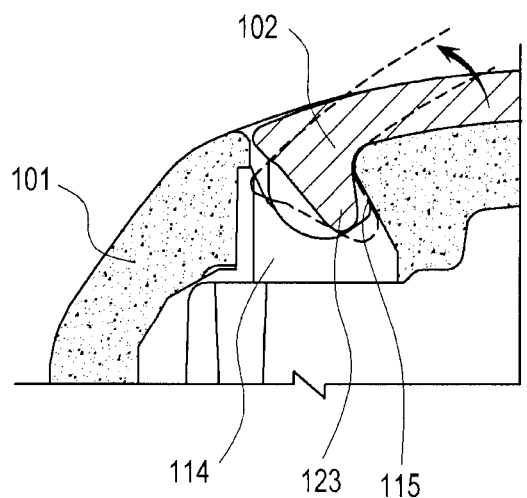
FIG. 4 illustrates a first hook of the battery cover illustrated in FIG. 3, which is interfered in the portable terminal.
Figure 5:
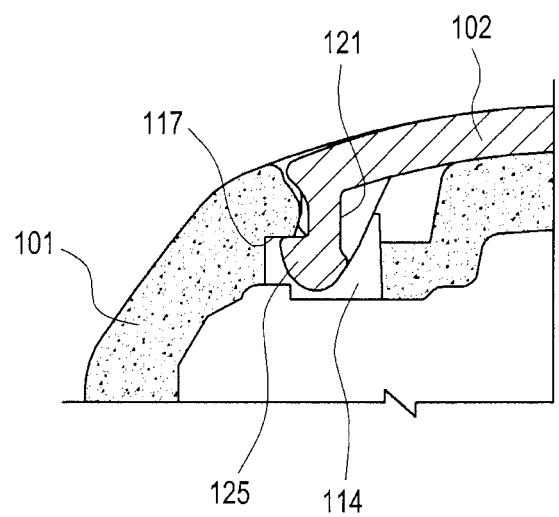
FIG. 5 illustrates a second hook of the battery cover illustrated in FIG. 3, which is engaged in the portable terminal.

In accordance with the present invention, hook grooves 114 are formed in the engagement recesses 113 and arranged along the extending direction of the engagement recesses 113, by way of example. The hook grooves 114 are positioned in correspondence with the hooks 123 and 125 formed in the battery cover 102 in order to more stably secure space in which the hooks 123 and 125 are accommodated and engaged. This means that the hook grooves 114 do not need to be formed, but the use of the stepped portions 117 and the inclination surfaces 115 in correspondence with the hooks 123 and 125 should be sufficient to engage the battery cover 102 with the portable terminal 100. One of the inclination surface 115 and the stepped portion 117 is formed in each of the hook grooves 114. Referring to FIGS. 4 and 5, the inclination surface 115 is positioned on the inside wall of engaging recess 113, more particularly on the inside wall of the hook groove 114 toward the outside of the body housing 101, and the stepped portion 117 is positioned on the outside wall of the engagement recess 113, more particularly on the inside wall of the hook groove 115 toward the frontal surface of the body housing 101. The inclination surface 115 and the stepped portion 117 are formed apart from each other by a predetermined distance in the engagement recess 113, not facing each other.

Referring back to FIG. 3, an opening 129 extends through both surfaces of the battery cover 102 so that the camera module 118 is exposed outward through the opening 129. That is, even though the battery cover 102 is engaged with the body housing 101, the camera module 118 operates independently via a separate path for taking a photo.

As described before, the engagement ribs 121 are formed along both side ends of the battery cover 102. The engagement ribs 121 are extended along the lengthwise direction of the portable terminal 100, particularly the body housing 101, protruding from both side ends, specifically both inner side surfaces of the battery cover 102, face to face. When the battery cover 102 is engaged with the body housing 101, the engagement ribs 121 are engaged in the engagement recesses 113. The hooks 123 and 125 are divided into the first hooks 123 formed on the inner side surfaces of the engagement ribs 121, and the second hooks 125 formed on the outer side surfaces of the engagement ribs 121.

The first hooks 123 protrude from the inner side surfaces of the engagement ribs 121, whereas the second hooks 125 protrude from the outer side surfaces of the engagement ribs 121. Preferably, only the first hooks 123 are formed on one engagement rib 121 formed at one side of the battery cover 102, and the first and second hooks 123 and 125 are formed on the other engagement rib 121 formed at the other side of the battery cover 102.

In accordance with the present invention, the battery cover engagement structure of the portable terminal 100 is configured by forming the engagement ribs 121 at both sides of the battery cover 102 and forming a plurality of first hooks 123 at one side of the engagement rib 121 and first and second hooks 123 and 125 on the other side of the engagement rib 121. Note that the number of the first hooks 123 formed on the one side of the engagement rib 121 may be equal to the total number of the first and second hooks 123 and 125 formed on the other side of the engagement rib 121.

Since the first and second hooks 123 and 125 are formed on the inner and outer side surfaces of the engagement ribs 121 in the manner described above, the strength of the engagement ribs 121 and thus the strength of the battery cover 102 can be increased. A distorting force, a bending force or an external impact may deform a specific part of the portable terminal, for example, a battery cover made with a metal material as thin as up to 0.7 mm. In the present invention, the engagement ribs 121 are extended along the lengthwise direction of the portable terminal 100, particularly the body housing 101, protruding from both side ends, specifically both inner side surfaces of the battery cover 102, such that the engagement ribs 121 provide a rib-structure for the battery cover 102 made with thin metal plate, thus the strength of the battery cover 102 in a shape of a flat plate is increased by the engagement ribs 121 protruding from the inner side surfaces of the battery cover 102. Likewise, the hooks 123 and 125 can provide a rib-structure for the engagement ribs 121, thus the strength of the engagement ribs 121, Ultimately, the strength of the battery cover 102 in a shape of a flat plate is increased by hooks 123 and 125. If hooks are formed only on one surface of the engagement ribs 121, the engagement ribs 121 may be strong enough to suppress deformation caused by an external force applied in a specific direction. However, the engagement ribs 121 may not be strong against external force applied in any other direction. Moreover, if hooks are formed only on the inner or outer side surfaces of the engagement ribs 121, the battery cover 102 may not be readily detached from the portable terminal 101, thus the user may attempt to remove the battery cover 102 with an excessive force. As a result, the battery cover 102 is vulnerable to a permanent deformation. On the contrary, since the hooks 123 and 125 are formed on the inner and outer side surfaces of the engagement ribs 121, the engagement ribs 121 and the battery cover 102 get strong enough to endure an external force applied in various directions, and the user can readily remove the battery cover 102 without the need for applying an excessive force.

Engagement pieces 127 may be formed at upper and lower ends of the battery cover 102 for bringing the upper and lower edges of the battery cover 102 into close contact with the body housing 101, thus preventing a formation of a gap between a part of the battery cover 102 and the body housing 101. A manipulation groove 122 may further formed at one edge of the battery cover 102 so that the user can remove the battery cover 102 from the body housing 101 using the manipulation groove 122.

Although the first and second hooks 123 and 125 may be formed at any side of the battery cover 102, it is preferred that the second hooks 125 and the manipulation groove 122 are formed at opposite side edges of the battery cover 102.

Referring to FIGS. 4 and 5, when the battery cover 102 is engaged with the body housing 101, the first hooks 123 are engaged in the engagement recesses 113, particularly in the hook grooves 114, while being interfered with the inclination surfaces 115. Herein, the second hooks 125 are caught to the stepped portions 117, thereby preventing the battery cover 102 from being removed from the body housing 101. When the user removes the battery cover 102 using the manipulation groove 122, the battery cover 102 rotates upon the other side end of the battery cover 102 on which the second hooks 125 are formed. At the same time, the first hooks 123 restrict the rotation range of the battery cover 102, closely contacting the inclination surfaces 115. With the first hooks 123 in close contact with the inclination surfaces 115, that is, with the battery cover 102 inclined with respect to the rear surface of the body housing 101, the user may completely remove the battery cover 102 from the rear surface of the body housing 101 by moving the second hooks 125 from the engagement recess 113 in a removal direction.

As described above, while the battery cover 102 is engaged with the body housing 101, the hooks 123 and 125 formed on the battery cover 102 stably fix the battery cover 102, in engagement with the inclination surfaces 115 or the stepped portions 117. When the battery cover 102 is removed from the body housing 101, the hooks 123 and 125 can be removed from the inclination surfaces 115 or the stepped portions 117 without causing a substantial deformation to the battery cover 102 on the whole. Therefore, the battery cover 102 can be readily removed or assembled from or to the body housing 101 without deforming the battery cover 102.

As is apparent from the above description of the present invention, because hooks are formed on the inner and outer surfaces of engagement ribs in a battery cover of a portable terminal, the strength of the battery cover as well as the strength of the engagement ribs can be increased. Therefore, the battery cover can be protected from a deformation that may be produced during an attachment or removal of the battery cover to or from the portable terminal or that may be caused by an external impact. Further, the hooks stabilize the engagement of the battery cover on the portable terminal. As the hooks are engaged with or removed from the portable terminal by rotating the battery cover, the battery cover can be readily engaged with or removed from the portable terminal.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A portable terminal, comprising:
a housing;
a battery mounting portion formed on a rear of the housing and having engagement recesses formed at both edges thereon; and
a battery cover having a pair of lateral sides and an upper end and a lower end, the battery cover having a plurality of engagement ribs extended along the pair of lateral sides thereof and formed on a surface thereof and protruding from an inner surface of the respective lateral sides of said battery cover for engaging with the engagement recesses, and in which the battery cover includes at least one first hook and at least one second hook rotatably engaged with the engagement recesses along lateral sides of the housing, wherein the at least one first hook protrudes from an inner surface of at least one of the plurality of engagement ribs at both of the lateral sides and the at least one second hook protrudes from an outer surface of the plurality of engagement ribs at one of the lateral sides, the at least one first hook and the at least one second hook are engaged to or removed from the portable terminal by rotating the battery cover,
gap formation prevention means for preventing formation of a gap between upper and lower edges of the battery cover and the housing in which said gap formation prevention means comprising a plurality of engagement pieces wherein each engagement piece of the plurality of engagement pieces is formed respectively at one of the upper end or lower end of said battery cover,
wherein the first and second hooks and the engagement ribs are positioned so that the battery cover is adapted to endure an external force applied to the battery cover in various directions, and wherein the battery cover is removable by the positioning of the first and second hooks without causing deformation to the battery cover.

2. The portable terminal of claim 1, wherein the at least one first hook is formed at engagement ribs at both lateral sides of the cover and the at least one second hook is formed only at engagement ribs at one lateral side of the cover.

3. The portable terminal of claim 1, further comprising a manipulation groove formed at one end of the battery cover.

4. The portable terminal of claim 3, further comprising at least one stepped portion formed in at least one of the engagement recesses, wherein when the battery cover disposed over the battery mounting portion, the at least one second hook is inserted into the at least one of the engagement recesses and slidably engaged by the at least one stepped portion, and wherein when one side of the battery cover is removed from the battery mounting portion from an engaged state, the at least one second hook is disengaged from the at least one stepped portion.

5. The portable terminal of claim 3, further comprising at least one inclination surface formed in at least one of the engagement recesses, wherein when one lateral side of the battery cover is removed from the battery mounting portion from an engaged state, the battery cover rotates at another lateral side of the battery cover and the at least one first hook is interfered with the at least one inclination surface, thereby restricting a rotation range of the battery cover at the other lateral side of the battery cover.

6. The portable terminal of claim 1, further comprising a plurality of hook grooves formed in the engagement recesses, wherein when the battery cover is disposed over the battery mounting portion, each of the at least one first hook and the at least one second hook is engaged to one of the hook grooves.

7. The portable terminal of claim 6, further comprising at least one stepped portion formed in at least one of the hook grooves, wherein when the battery cover is disposed over the battery mounting portion, the at least one second hook is slidably engaged by the at least one stepped portion.

8. The portable terminal of claim 7, wherein when one lateral side of the battery cover is removed from the battery mounting portion from an engaged state, the battery cover rotates at the other lateral side of the battery cover and the at least one second hook is disengaged from the at least one stepped portion.

9. The portable terminal of claim 6, further comprising an least one inclination surface formed in at least one of the hook grooves, wherein when one of the pair of lateral sides of the battery cover is removed from the battery mounting portion from an engaged state, the battery cover rotates at the other lateral side of the battery cover and the at least one first hook is interfered with the at least one inclination surface, thereby restricting a rotation range of the battery cover at the other lateral side of the battery cover.

10. A cover member engaging device comprising:
a housing having at least one opening;
a cover member engaged with the housing and having a pair of lateral sides and upper and lower ends, the cover member having a plurality of engagement ribs formed along the pair of lateral sides thereon and protruding from an inner surface of both sides of said cover member for engaging with the housing,
the cover member including at least one first hook and at least one second hook rotatably engaged with engagement recesses along lateral sides of the housing, wherein the at least one first hook protrudes from an inner surface of at least one of the plurality of engagement ribs at both of the lateral sides and the at least one second hook protrudes from an outer surface of the plurality of engagement ribs at one of the lateral sides, the at least one first hook and the at least one second hook are engaged to or removed from the housing by rotating the cover member,
gap formation prevention means for preventing formation of a gap between upper and lower edges of the cover member and the housing in which said gap formation prevention means comprises a plurality of engagement pieces wherein each engagement piece of the plurality of engagement pieces is formed respectively at one of the upper end and lower end of the cover member,
wherein the first and second hooks and the engagement ribs are positioned so that the cover member is adapted to endure an external force applied to the cover member in various directions without deformation, and wherein the cover member is removable is without causing deformation to the cover member.

11. The cover member engaging device of claim 10, wherein the at least one first hook is formed on the engagement ribs at a first lateral side of the cover member and the at least one second hook is formed only on the engagement ribs at a second lateral side of the cover member.

12. The cover member engaging device of claim 11, further comprising a manipulation groove formed at one of the first lateral side or the second lateral side of the cover member.

13. The cover member engaging device of claim 12, further comprising at least one stepped portion formed in at least one of a plurality of engagement recesses, wherein when the cover member is engaged with the housing, the at least one second hook is inserted into the at least one of the engagement recesses and slidably engaged by the at least one stepped portion, and wherein when one of the first lateral side and the second lateral side of the cover member is removed from a battery mounting portion from an engaged state, the at least one second hook is disengaged from the at least one stepped portion.

14. The cover member engaging device of claim 12, further comprising at least one inclination surface formed in at least one of a plurality of engagement recesses, wherein when one side of the cover member is removed from a battery mounting portion from an engaged state, the cover member rotates at the second lateral side of the cover member and the at least one first hook is interfered with the at least one inclination surface, thereby restricting a rotation range of the cover member at the second lateral side of the cover member.

15. The cover member engaging device of claim 10, further comprising a plurality of hook grooves formed in engagement recesses, wherein when the is engaged with the housing, each of the at least one first hook and the at least one second hook is engaged to one of the hook grooves.

* * * * *

UNITED STATES PATENT AND TRADEMARK OFFICE
CERTIFICATE OF CORRECTION

| | | |
|---|---|---|
| PATENT NO. | : 9,215,299 B2 | Page 1 of 1 |
| APPLICATION NO. | : 13/405546 | |
| DATED | : December 15, 2015 | |
| INVENTOR(S) | : Doo-Hyun Kim et al. | |

It is certified that error appears in the above-identified patent and that said Letters Patent is hereby corrected as shown below:

In the Claims

Column 7, Claim 9, Lines 29-30 should read as follows:
--...comprising an at least...--

Column 8, Claim 15, Line 48 should read as follows:
--...the cover member is...--

Signed and Sealed this
Twenty-eighth Day of June, 2016

Michelle K. Lee
*Director of the United States Patent and Trademark Office*